United States Patent
Li et al.

(10) Patent No.: US 10,850,287 B2
(45) Date of Patent: Dec. 1, 2020

(54) METHOD AND DEVICE FOR STOPPING A MAGNETIC SUSPENSION CENTRIFUGE

(71) Applicant: GREE GREEN REFRIGERATION TECHNOLOGY CENTER CO., LTD. OF ZHUHAI, Zhuhai (CN)

(72) Inventors: Yan Li, Zhuhai (CN); Gaochan Niu, Zhuhai (CN); Guanghui Chen, Zhuhai (CN)

(73) Assignee: GREE GREEN REFRIGERATION TECHNOLOGY CENTER CO., LTD. OF ZHUHAI, Zhuhai (CN)

( * ) Notice: Subject to any disclaimer, the term of this patent is extended or adjusted under 35 U.S.C. 154(b) by 228 days.

(21) Appl. No.: 16/070,647

(22) PCT Filed: Jan. 20, 2017

(86) PCT No.: PCT/CN2017/071924
§ 371 (c)(1),
(2) Date: Jul. 17, 2018

(87) PCT Pub. No.: WO2017/125072
PCT Pub. Date: Jul. 27, 2017

(65) Prior Publication Data
US 2020/0047191 A1    Feb. 13, 2020

(30) Foreign Application Priority Data
Jan. 20, 2016 (CN) .......................... 2016 1 0037499

(51) Int. Cl.
*B04B 9/10* (2006.01)
*B04B 9/12* (2006.01)
(Continued)

(52) U.S. Cl.
CPC .................. *B04B 9/10* (2013.01); *B04B 9/12* (2013.01); *B04B 11/04* (2013.01); *B04B 13/00* (2013.01);
(Continued)

(58) Field of Classification Search
CPC .. B04B 9/10; B04B 9/12; B04B 11/04; B04B 13/00; F16C 32/047; F16C 2231/00; F16C 2300/02
See application file for complete search history.

(56) References Cited

U.S. PATENT DOCUMENTS 2,256,937 A * 9/1941 Beams ...................... B04B 5/08
310/90.5
2,790,553 A * 4/1957 Bange, Jr. ............... B04B 13/00
210/138
(Continued)

FOREIGN PATENT DOCUMENTS

| CN | 102611360 A | 7/2012 |
| CN | 203039490 U | 7/2013 |

(Continued)

OTHER PUBLICATIONS

"Braking Mode of Frequency Converter" Application and Maintenance of Frequency Converter, 2014, 12 pages.
(Continued)

*Primary Examiner* — Charles Cooley
(74) *Attorney, Agent, or Firm* — Oblon, McClelland, Maier & Neustadt, L.L.P.

(57) ABSTRACT

A method and a device for stopping a magnetic suspension centrifuge includes: a frequency-conversion cabinet connected with the magnetic suspension centrifuge judges a stopping state of the magnetic suspension centrifuge; if the stopping state is judged to satisfy a preset condition, the frequency-conversion cabinet switches a operating mode of
(Continued)

a motor of the magnetic suspension centrifuge from an electrically-powered state mode to a power generation state mode, so as to convert the inertia mechanical energy of the motor when the motor stops into electric energy; and the frequency-conversion cabinet leads the electric energy into a power grid, so as to consume the electric energy. Accordingly, the problem that the motor of the magnetic suspension centrifuge cannot be rapidly switched from an operating state to a stopping state when an exception occurs to a bearing or a bearing controller in the prior art can be solved.

4 Claims, 1 Drawing Sheet

(51) Int. Cl.
   *B04B 13/00* (2006.01)
   *F16C 32/04* (2006.01)
   *B04B 11/04* (2006.01)
(52) U.S. Cl.
   CPC ........ *F16C 32/047* (2013.01); *F16C 2231/00* (2013.01); *F16C 2300/02* (2013.01)

(56) References Cited

U.S. PATENT DOCUMENTS

| | | | | |
|---|---|---|---|---|
| 3,216,655 | A * | 11/1965 | Jaap | B04B 5/08 494/61 |
| 3,307,884 | A * | 3/1967 | Dunlap | F16C 32/0444 310/90.5 |
| 4,295,803 | A * | 10/1981 | Barthelmess | B07B 7/083 417/423.12 |
| 4,363,525 | A * | 12/1982 | Poubeau | F16C 32/0444 310/90 |
| 4,398,773 | A * | 8/1983 | Boden | F01D 25/16 310/90.5 |
| 5,203,762 | A * | 4/1993 | Cooperstein | B04B 1/2016 318/376 |
| 5,485,066 | A * | 1/1996 | Zeigler | B04B 9/10 318/34 |
| 5,726,550 | A * | 3/1998 | Inaniwa | B04B 9/10 318/269 |
| 6,100,618 | A * | 8/2000 | Schoeb | F04D 1/006 310/90 |
| 2001/0023229 | A1* | 9/2001 | Inaniwa | B04B 9/10 494/7 |
| 2002/0047402 | A1* | 4/2002 | Taniguchi | F16C 32/0457 310/90.5 |
| 2002/0074882 | A1* | 6/2002 | Werfel | G01M 17/007 310/90.5 |
| 2004/0112800 | A1* | 6/2004 | Ogino | F16C 39/02 209/199 |
| 2004/0259710 | A1* | 12/2004 | Rafferty | B04B 9/12 494/15 |
| 2012/0063918 | A1* | 3/2012 | de Larminat | F16C 19/52 417/1 |
| 2012/0206071 | A1* | 8/2012 | Keen | H02P 3/14 318/376 |
| 2012/0260687 | A1* | 10/2012 | Inaniwa | B04B 9/10 62/196.1 |
| 2014/0031191 | A1* | 1/2014 | Inaniwa | B04B 15/02 494/9 |
| 2014/0235421 | A1* | 8/2014 | Rogers | B04B 13/00 494/10 |
| 2015/0194913 | A1* | 7/2015 | Hessler | B04B 9/10 |
| 2016/0230810 | A1* | 8/2016 | Huang | G05B 6/02 |
| 2020/0047191 | A1* | 2/2020 | Li | B04B 9/10 |

FOREIGN PATENT DOCUMENTS

| | | | | |
|---|---|---|---|---|
| CN | 104467544 | A | | 3/2015 |
| CN | 105689160 | A | | 6/2016 |
| GB | 924723 | A | * | 5/1963 ............... B04B 9/00 |
| GB | 1392210 | A | * | 4/1975 .......... F16C 32/0444 |
| JP | 2009-240886 | A | | 10/2009 |

OTHER PUBLICATIONS

International Search Report dated Apr. 7, 2017 in PCT/CN2017/071924 filed Jan. 20, 2017.

* cited by examiner

METHOD AND DEVICE FOR STOPPING A MAGNETIC SUSPENSION CENTRIFUGE

The present application claims the priority of Chinese patent application No. 201610037499.2, filed in the Chinese Patent Office on Jan. 20, 2016, and entitled "Method and Device for Stopping A Magnetic Suspension Centrifuge", the entire contents of which are herein incorporated by reference.

FIELD OF THE INVENTION

The present application relates to the field of automation control technology, and more particularly, to a method and a device for stopping a magnetic suspension centrifuge

BACKGROUND OF THE INVENTION

The magnetic suspension centrifuge is one of the common centrifuges, and as a major part of the magnetic suspension centrifuge, a motor has increasingly attracted widespread attentions due to its operational performance The following method is usually adopted for stopping a magnetic suspension centrifuge: firstly, whether an input power system is normal when the centrifuge stops is judged. If the three-phase electricity input is normal, then the motor of the centrifuge can be operated in a decelerating state so as to stop the centrifuge; if the three-phase electricity input is abnormal, then a major loop and a charging loop of the frequency-conversion cabinet need to be disconnected, meanwhile, the motor of the centrifuge is enabled to operate at an electric energy feedback mode, so as to supply power to the magnetic suspension controller until the motor stops operating.

However, when the above stopping method is adopted, only reliable stopping of the centrifuge when the power supply system is abnormal is considered. If an exception occurs to the bearing or the bearing controller of a magnetic suspension centrifuge, under the above stopping method, the motor of the centrifuge will operate continuously due to inertia. No matter whether the motor operates at a decelerating state or at an electric energy feedback state, it takes too long a time for the motor from operating to stopping. When an exception occurs to the bearing or the bearing controller, if the motor cannot be rapidly switched from an operating state to a stopping state, the bearing will be damaged seriously due to a long-term rotation of the motor.

Aiming at the above problem, no effective solution has been proposed now.

SUMMARY OF THE INVENTION

Embodiments of the present application provide a method for stopping a magnetic suspension centrifuge. The method comprises: a frequency-conversion cabinet connected with the magnetic suspension centrifuge judges a stopping state of the magnetic suspension centrifuge; if the stopping state is judged to satisfy a preset condition, the frequency-conversion cabinet switches an operating mode of a motor of the magnetic suspension centrifuge from an electrically-powered state mode to a power generation state mode, so as to convert the inertia mechanical energy of the motor when the motor stops into electric energy; and the frequency-conversion cabinet leads the electric energy into a power grid, so as to consume the electric energy.

In one embodiment, the frequency-conversion cabinet connected with the magnetic suspension centrifuge judging a stopping state of the magnetic suspension centrifuge comprises: the frequency-conversion cabinet connected with the magnetic suspension centrifuge receives a stopping instruction sent by the magnetic suspension centrifuge, and extracts the operating parameters of a bearing and a bearing controller of the magnetic suspension centrifuge and the operating parameters of a power supply system of the magnetic suspension centrifuge from the stopping instruction.

In one embodiment, the stopping state satisfying a preset condition comprises: when the magnetic suspension centrifuge stops, the bearing or the bearing controller of the magnetic suspension centrifuge is in failure.

In one embodiment, the frequency-conversion cabinet leading the electric energy obtained from the motor by means of switching into a power grid so as to consume the electric energy obtained by means of switching comprises: the motor in a power generation state mode utilizes the electric energy to supply power to a DC bus of the frequency-conversion cabinet, such that a pumping voltage is generated on the DC bus; the frequency-conversion cabinet converts the pumping voltage into a current with a first phase, and inputs the current with the first phase into a power grid, wherein the second phase and the first phase possessed by the voltage in the power grid differ by 180°.

In one embodiment, the frequency-conversion cabinet converting the pumping voltage into a current with a first phase comprises: the frequency-conversion cabinet utilizes a four-quadrant controller to convert the pumping voltage into a current with a first phase via an electric reactor.

Embodiments of the present application further provide a device for stopping a magnetic suspension centrifuge. The device comprises: a stopping state judgment unit, configured to judge the stopping state of the magnetic suspension centrifuge; an operating mode switching unit, configured to switch an operating mode of the motor of the magnetic suspension centrifuge from an electrically-powered state mode to a power generation state mode when the stopping state is judged to satisfy a preset condition, so as to convert the inertial mechanical energy of the motor when the motor stops into electric energy; and an electric energy consumption unit, configured to lead the electric energy into a power grid, so as to consume the electric energy.

In one embodiment, the stopping state judgment unit comprises: a stopping instruction receiving module, configured to receive a stopping instruction sent by the magnetic suspension centrifuge; and an operating parameter extraction module, configured to extract the operating parameters of a bearing and a bearing controller of the magnetic suspension centrifuge and the operating parameters of a power supply system of the magnetic suspension centrifuge from the stopping instruction.

In one embodiment, the stopping state satisfying a preset condition comprises: when the magnetic suspension centrifuge stops, the bearing or the bearing controller of the magnetic suspension centrifuge is in failure.

In one embodiment, the electric energy consumption unit comprises: a DC bus power supply module, configured to supply power to a DC bus of the frequency-conversion cabinet by utilizing the electric energy, such that a pumping voltage is generated on the DC bus; and a grid module, configured to convert the pumping voltage into a current with a first phase, and input the current with the first phase into a power grid, wherein the second phase and the first phase possessed by the voltage in the power grid differ by 180°.

In one embodiment, the grid module comprises: a conversion module, configured to utilize a four-quadrant controller to convert the pumping voltage into a current with a first phase via an electric reactor.

Based on the method and device for stopping a magnetic suspension centrifuge of the present application, and through an analysis on the stopping state of the magnetic suspension centrifuge, whether a bearing or a bearing controller of the magnetic suspension centrifuge is in failure can be judged. When a failure occurs, the operating mode of the motor of the magnetic suspension centrifuge can be switched, such that the mechanical energy generated by the rotation of the motor can be switched into electric energy, and then the electric energy can be led into a power grid, and the electric energy can be consumed rapidly by the power grid. In this way, the motor can stop rotating within a short time, thereby avoiding greater damages to the bearing.

BRIEF DESCRIPTION OF THE ACCOMPANYING DRAWINGS

The accompanying drawings constituting a part of the present application provide a further understanding of the present application, and the illustrative embodiments and descriptions thereof in the present application are used for illustrating the present application, rather than limiting the present application in an improper way. In the drawings.

DETAILED DESCRIPTION OF THE PREFERRED EMBODIMENTS

In order to make those skilled in the art better understand the technical solutions in the present application, a clear and complete description will be given below on the technical solutions in the embodiments of the present application in combination with the accompanying drawings in the embodiments of the present application. Apparently, the described embodiments are merely a part, rather than all of the embodiments of the present application. Based on the embodiments in the present application, all the other embodiments obtained by those skilled in the art without any creative effort shall all fall within the protection scope of the present application.

Figure 1:
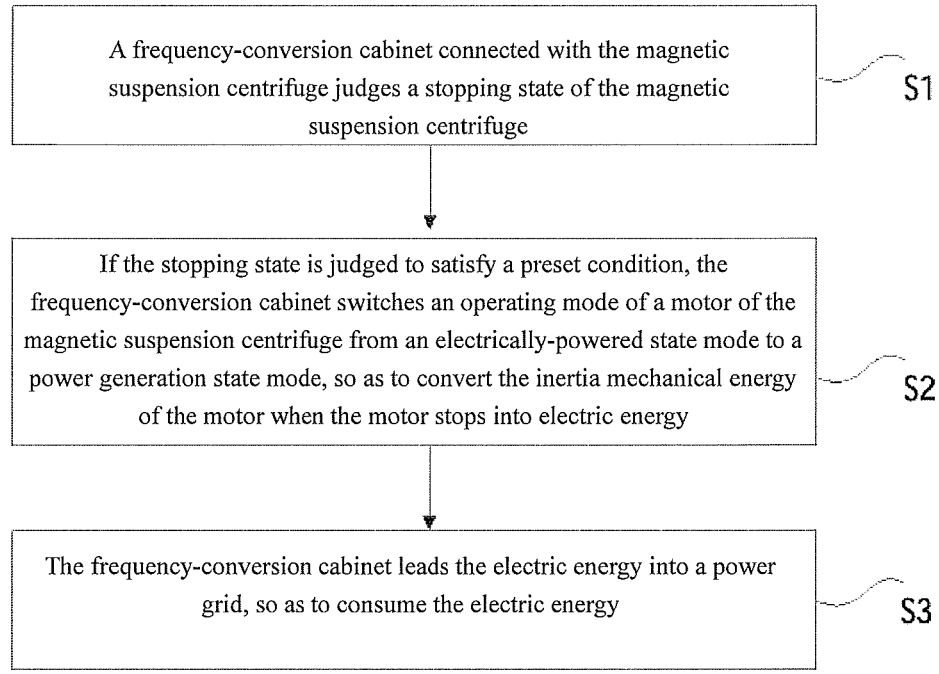
FIG. 1 is a flow chart of a method for stopping a magnetic suspension centrifuge provided by embodiments of the present application.

FIG. 1 is a flow chart of a method for stopping a magnetic suspension centrifuge provided by embodiments of the present application. Although the flow described below comprises multiple operations which are executed in a certain sequence, however, it should be clearly understood that, these processes can include more or fewer operations, and these operations can be executed in sequence or executed concurrently (for example, a concurrent processor or a multithreading environment can be used). As shown in FIG. 1, the method can comprise:

S1: a frequency-conversion cabinet connected with the magnetic suspension centrifuge judges a stopping state of the magnetic suspension centrifuge.

In the embodiments of the present application, the magnetic suspension centrifuge can be connected with a frequency-conversion cabinet, and the frequency-conversion cabinet can include a rectifier and an inverter. The rectifier and the inverter can be connected via a DC bus, after the rectifier converts the input AC into a DC, the DC bus can supply the DC converted by the rectifier to the inverter. The inverter can again convert the DC converted by the rectifier into an AC with a certain frequency. The AC with a certain frequency can be input into the magnetic suspension centrifuge, and through changing the frequency of the AC, the operating mode of the motor in the magnetic suspension centrifuge can be controlled. In actual applications, the conversion of current and control of frequency in the frequency-conversion cabinet can both be realized via a frequency-conversion cabinet controller, and the frequency-conversion cabinet controller can be remotely connected with the frequency-conversion cabinet, so as to realize remote operation of the frequency-conversion cabinet.

A bearing of a motor in a magnetic suspension centrifuge is an important part, when the bearing of a motor is in failure, the motor should stop operating immediately, otherwise, continuous operation of the bearing which is in failure may lead to serious damage to the bearing. In addition, in actual applications, the bearing is usually remotely controlled via a bearing controller, therefore, when the bearing controller is in failure, the motor should also stop operating immediately.

In the embodiments of the present application, the frequency-conversion cabinet can monitor the operating state of the magnetic suspension centrifuge in real time. Specifically, the magnetic suspension centrifuge can encapsulate its operating parameters into a message to send to the frequency-conversion cabinet based on a preset period. When the magnetic suspension centrifuge stops, the stopping instruction can be sent to the frequency-conversion cabinet. In this way, when the frequency-conversion cabinet receives the stopping instruction sent by the magnetic suspension centrifuge, the operating parameters of the bearing and the bearing controller of the magnetic suspension centrifuge and the operating parameters of the power supply system of the magnetic suspension centrifuge can be extracted from the stopping instruction. Through an analysis on the operating parameters of the bearing and the bearing controller and the operating parameters of the power supply system, whether the bearing, the bearing controller and the power supply system are in a normally operating state when the magnetic suspension centrifuge stops can be judged.

S2: if the stopping state is judged to satisfy the preset condition, the frequency-conversion cabinet switches the operating mode of the motor of the magnetic suspension centrifuge from an electrically-powered state mode to a power generation state mode, so as to convert the inertial mechanical energy of the motor when the motor stops into electric energy.

In the embodiments of the present application, when the magnetic suspension centrifuge stops, the stopping state is usually in the following situations:

1) the bearing and the bearing controller are normal, and the power supply system is also normal.

Under this condition, after the magnetic suspension centrifuge stops, the motor can operate at a decelerating state and then gradually stops operating.

2) the bearing and the bearing controller are normal, but the power supply system is in failure.

Under this condition, since the power supply system cannot supply power to the magnetic suspension centrifuge, then after the magnetic suspension centrifuge stops, a major loop and a charging loop of the frequency-conversion cabinet need to be disconnected, so as to prevent the influence of the power supply system on the magnetic suspension centrifuge. Meanwhile, in order to avoid sudden power failure of the magnetic suspension centrifuge when the magnetic suspension centrifuge stops, the motor of the magnetic suspension centrifuge can operate at an electric energy feedback mode, so that electric energy can be generated when the motor is rotating, and the magnetic suspension centrifuge can operate continuously for a period of time until the motor stops rotating.

For the above two situations, corresponding stopping measures are available in the prior art. In the embodiments of the present application, reasonable stopping measures can be adopted aiming at the situation that the bearing or the bearing controller is in failure. Specifically, when the frequency-conversion cabinet finds out that the bearing or the bearing controller is abnormal from the extracted operating parameters of the bearing and the bearing controller in the magnetic suspension centrifuge, then the frequency-conversion cabinet can determine that the current stopping state of the magnetic suspension centrifuge satisfies the preset condition, so as to start protection measures of stopping the magnetic suspension centrifuge.

In actual applications, the frequency-conversion cabinet switches the operating mode of a motor of the magnetic suspension centrifuge from an electrically-powered state mode to a power generation state mode, so as to convert the inertia mechanical energy of the motor when the motor stops into electric energy. At this time, since the bearing or the bearing controller of the magnetic suspension centrifuge is in failure, the motor should be switched to a stopping state from a rotating state within the shortest time. After the mechanical energy generated by the rotation of the motor is converted into electric energy, a mode of rapidly consuming the switched electric energy should be found.

S3: the frequency-conversion cabinet leads the electric energy into a power grid, so as to consume the electric energy.

In the embodiments of the present application, the frequency-conversion cabinet can lead the electric energy into a power grid, so as to consume the electric energy. Since the power grid has a greater demand on the electric energy, after the electric energy converted by the motor is led into the power grid, the electric energy can be rapidly consumed. At this time, the rotating motor actually supplies power to the power grid, and when the speed at which the power grid consumes electricity is greater than or equal to the electric energy converted by the motor, the motor can rapidly stop rotating within a short time.

Specifically, in the embodiments of the present application, the motor at a power generation state mode can supply power to a DC bus of the frequency-conversion cabinet by utilizing the electric energy converted by the motor, such that a pumping voltage is generated on the DC bus. A feedback loop can be directly established between the motor and the DC bus, and through the feedback loop, the motor can load the converted electric energy onto the DC bus. Since the electric energy on the DC bus cannot be fed back to an input end via a rectifier bridge, the electric energy provided by the motor can only be absorbed by the capacitors of the DC bus, so that the voltage at two ends of the DC bus rises and a pumping voltage is formed.

After a pumping voltage is formed, the frequency-conversion cabinet can convert the pumping voltage into a current, and lead the current into a power grid for consumption. After the frequency-conversion cabinet provides the converted current to the power grid, the provided current can only be absorbed by the power grid only when a certain condition is satisfied. If a certain condition is not satisfied, the power grid may supply power to the frequency-conversion cabinet, which is not beneficial for rapidly switching the rotating state of the motor. Specifically, the frequency-conversion cabinet can utilize a four-quadrant controller to convert the generated pumping voltage into a current with a first phase via an electric reactor. The first phase and the second phase which is possessed by the voltage in the power grid should differ from each other by 180°. In this way, from the side of the power grid, the power provided by the frequency-conversion cabinet can be expressed by the following formula:

$$P = UI \cos \varphi$$

wherein P is the power provided by the frequency-conversion cabinet, U is the voltage provided by the frequency-conversion cabinet, I is the current provided by the frequency-conversion cabinet, $\varphi$ is the phase difference between U and I. wherein U and the voltage in the power grid are of the same phase, while I and the voltage in the power grid are inversed (with a phase difference of 180°), then the result calculated through the above formula is a negative number. From the side of the power grid, the power provided by the frequency-conversion cabinet is a negative number, and then it indicates that the power grid is absorbing the electric energy provided by the frequency-conversion cabinet. In this way, the electric energy converted by the motor of the mechanical energy generated by the rotation of the motor can be rapidly consumed by the power grid, so as to achieve the effect of rapidly switching the rotating state of the motor into a stopping state.

It can be seen from the above that, based on the stopping method for a magnetic suspension centrifuge, whether the bearing or the bearing controller of the magnetic suspension centrifuge is in failure can be judged through an analysis on the stopping state of the magnetic suspension centrifuge. When the bearing or the bearing controller is in failure, the operating mode of the motor of the magnetic suspension centrifuge can be switched, so as to convert the mechanical energy generated by the rotation of the motor into electric energy. Then the converted electric energy can be led into a power grid, and then the generated electric energy can be consumed rapidly by the power grid. In this way, the motor can stop rotating within a short time, thereby avoiding greater damages to the bearing.

Figure 2:
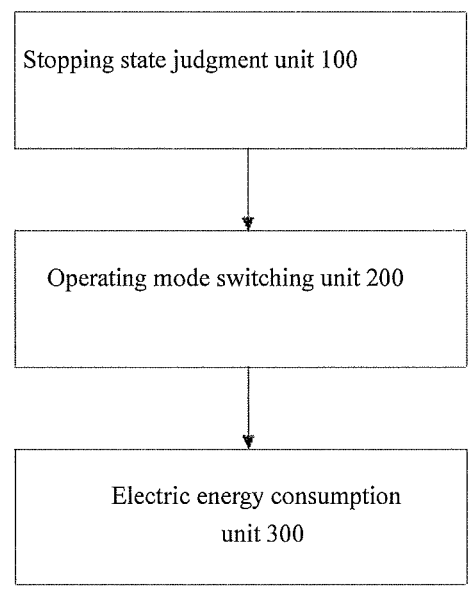
FIG. 2 is a functional module diagram of a device for stopping a magnetic suspension centrifuge provided by embodiments of the present application.

The present application further provides a device for stopping a magnetic suspension centrifuge. FIG. 2 is a functional module diagram of the stopping device for a magnetic suspension centrifuge provided by embodiments of the present application. As shown in FIG. 2, the device comprises:

a stopping state judgment unit 100, configured to judge the stopping state of the magnetic suspension centrifuge;

an operating mode switching unit 200, configured to switch the operating mode of the motor of the magnetic suspension centrifuge from an electrically-powered state mode to a power generation state mode when the stopping state is judged to satisfy the preset condition, so as to convert the inertial mechanical energy when the motor stops into electric energy; and an electric energy consumption unit 300, configured to lead the electric energy converted by the motor into a power grid, so as to consume the converted electric energy.

In one preferred embodiment of the present application, the stopping state judgment unit 100 specifically comprises:

a stopping instruction receiving module, configured to receive the stopping instruction sent by the magnetic suspension centrifuge; and an operating parameter extraction module, configured to extract the operating parameters of the bearing and the bearing controller of the magnetic suspension centrifuge and the operating parameters of the power supply system of the magnetic suspension centrifuge from the stopping instruction.

Wherein the stopping state satisfying a preset condition specifically comprises:

when the magnetic suspension centrifuge stops, the bearing or the bearing controller of the magnetic suspension centrifuge is in failure.

In one preferred embodiment of the present application, the electric energy consumption unit 300 specifically comprises:

a DC bus power supply module, configured to supply power to a DC bus of the frequency-conversion cabinet by utilizing the electric energy converted by the motor, such that a pumping voltage is generated on the DC bus; and a grid module, configured to convert the generated pumping voltage into a current with a first phase, and input the current with the first phase into a power grid, wherein the second phase possessed by the voltage in the power grid and the first phase differ by 180°.

wherein the grid module specifically comprises:

a conversion module, configured to utilize a four-quadrant controller to convert the generated pumping voltage into a current with a first phase via an electric reactor.

It should be noted that, specific implementation processes of each above functional module are consistent with steps S1 to S3, and will not be repeated redundantly herein.

It can be seen from the above that, based on the device for stopping a magnetic suspension centrifuge, whether the bearing or the bearing controller of the magnetic suspension centrifuge is in failure can be judged through an analysis on the stopping state of the magnetic suspension centrifuge. When the bearing or the bearing controller is in failure, the operating mode of the motor of the magnetic suspension centrifuge can be switched, so as to convert the mechanical energy generated by the rotation of the motor into electric energy. Then the converted electric energy can be led into a power grid, and then the generated electric energy can be consumed rapidly by the power grid. In this way, the motor can stop rotating within a short time, thereby avoiding greater damages to the bearing.

The descriptions above are merely preferred embodiments of the present invention, rather than a limitation to the present invention. For those skilled in the art, various modifications and variations can be made to the embodiments of the present invention. Any modification, equivalent substitution and improvement made within the spirit and principle of the present invention shall all fall within the protection scope of the present invention.

The invention claimed is:

1. A method for stopping a magnetic suspension centrifuge, comprising:
judging, via a frequency-conversion cabinet connected with the magnetic suspension centrifuge, a stopping state of the magnetic suspension centrifuge;
if the stopping state is judged to satisfy a preset condition, switching, via the frequency-conversion cabinet, an operating mode of a motor of the magnetic suspension centrifuge from an electrically-powered state mode to a power generation state mode, so as to convert inertia mechanical energy of the motor when the motor stops into electric energy;
leading, via the frequency-conversion cabinet, the electric energy into a power grid, so as to consume the electric energy, the motor in a power generation state mode utilizes the electric energy to supply power to a DC bus of the frequency-conversion cabinet, such that a pumping voltage is generated on the DC bus; and
converting, via a four-quadrant controller utilized by the frequency-conversion cabinet, the pumping voltage into a current with a first phase via an electric reactor, and inputs the current with the first phase into the power grid, wherein a second phase of the voltage in the power grid and the first phase differ by 180°,
wherein the stopping state is judged to satisfy the preset condition when a bearing or a bearing controller of the magnetic suspension centrifuge is in failure when the magnetic suspension centrifuge stops.

2. The method for stopping a magnetic suspension centrifuge according to claim 1, wherein the frequency-conversion cabinet connected with the magnetic suspension centrifuge judging a stopping state of the magnetic suspension centrifuge comprises:
the frequency-conversion cabinet connected with the magnetic suspension centrifuge receives a stopping instruction sent by the magnetic suspension centrifuge, and extracts operating parameters of the bearing and the bearing controller of the magnetic suspension centrifuge and operating parameters of a power supply system of the magnetic suspension centrifuge from the stopping instruction.

3. A device for stopping a magnetic suspension centrifuge, comprising:
a stopping state judgment unit, configured to judge a stopping state of the magnetic suspension centrifuge;
an operating mode switching unit, configured to switch an operating mode of a motor of the magnetic suspension centrifuge from an electrically-powered state mode to a power generation state mode if the stopping state is judged to satisfy a preset condition, so as to convert the inertial mechanical energy of the motor when the motor stops into electric energy, the stopping state is judged to satisfy a preset condition when a bearing or a bearing controller of the magnetic suspension centrifuge is in failure when the magnetic suspension centrifuge stops; and
an electric energy consumption unit, configured to lead the electric energy into a power grid, so as to consume the electric energy, wherein the electric energy consumption unit comprises:
a DC bus power supply module, configured to supply power to a DC bus of a frequency-conversion cabinet by utilizing the electric energy, such that a pumping voltage is generated on the DC bus; and
a grid module, the grid module comprising a conversion module configured to utilize a four-quadrant controller to convert the pumping voltage into a current with a first phase via an electric reactor, and input the current with the first phase into the power grid, wherein a second phase of the voltage in the power grid and the first phase differ by 180°.

4. The device for stopping a magnetic suspension centrifuge according to claim 3, wherein the stopping state judgment unit comprises:
a stopping instruction receiving module, configured to receive a stopping instruction sent by the magnetic suspension centrifuge; and
an operating parameter extraction module, configured to extract operating parameters of a bearing and a bearing controller of the magnetic suspension centrifuge and operating parameters of a power supply system of the magnetic suspension centrifuge from the stopping instruction.

* * * * *